United States Patent [19]

Kajiyama et al.

[11] Patent Number: 5,403,510
[45] Date of Patent: Apr. 4, 1995

[54] LIQUID CRYSTAL DISPLAY DEVICE AND PREPARATION THEREOF

[75] Inventors: Tisato Kajiyama, Fukuoka; Kouji Hara; Tohru Kashiwagi, both of Osaka, all of Japan

[73] Assignee: Sumitomo Electric Industries, Ltd., Osaka, Japan

[21] Appl. No.: 840,069

[22] Filed: Feb. 25, 1992

[30] Foreign Application Priority Data

Feb. 25, 1991 [JP] Japan ................................. 3-030228

[51] Int. Cl.$^6$ ...................... C09K 19/52; C09K 11/00; G02F 1/13
[52] U.S. Cl. .................................. 252/299.01; 428/1; 359/103
[58] Field of Search ...................... 252/289.01; 428/1; 359/103

[56] References Cited

U.S. PATENT DOCUMENTS

| 5,200,108 | 4/1993 | Yuasa et al. | 252/299.01 |
| 5,242,616 | 9/1993 | Finkenzeller et al. | 252/299.01 |

FOREIGN PATENT DOCUMENTS

| 0304153 | 2/1989 | European Pat. Off. . |
| 0313053 | 4/1989 | European Pat. Off. . |
| 4051021 | 2/1992 | Japan . |
| 9015854 | 12/1990 | WIPO . |

*Primary Examiner*—Shean Wu
*Attorney, Agent, or Firm*—Cushman, Darby & Cushman

[57] ABSTRACT

A liquid crystal display device which has a pair of transparent electrodes and a composite film having continuous pores of a polymer matrix filled with a liquid crystal material has high contrast and good heat resistance. The polymer matrix is made of (a) a cross-linked material prepared through an addition reaction of a carboxyl group-containing acrylonitrile/butadiene copolymer with an oxazoline compound, or (b) a fluorinated polyimide resin.

12 Claims, 1 Drawing Sheet

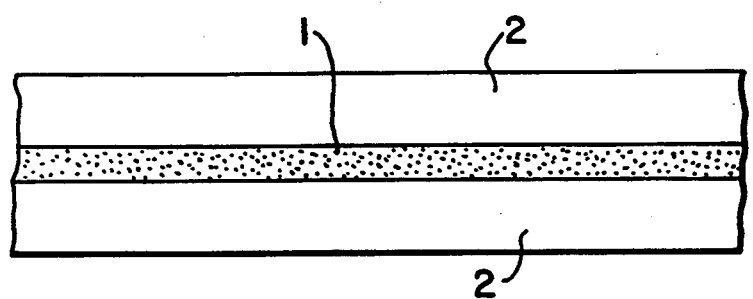

LIQUID CRYSTAL DISPLAY DEVICE AND PREPARATION THEREOF

BACKGROUND OF THE INVENTION

1. Field of the Invention

The present invention relates to a liquid crystal display device which can be used, for example, for a TV screen, various OA instruments and a display panel of automobile, and a method for preparing the liquid crystal display device.

2. Description of Related Art

Hitherto, a liquid crystal display device has been formed by injecting a liquid crystal material between a pair of transparent electrodes which are fixed with a gap of several micrometers. However, the above structure can not give the preparation of the display having a large area. In addition, brightness of the screen and an angle of view field are insufficient, since it is necessary to attach polarization plates having polarization axes which are perpendicular to each other to a pair of glass substrates enclosing the liquid crystal material.

Recently a new liquid crystal display device has been developed by Prof. Kajiyama et al of Kyusyu University, Japan [cf. for example, Polymer Preprints, Japan Vol. 37, No. 8, 2450 (1988); Chemistry Letters, 813–816 (1989); Chemistry Letters, 679–682 (1979); and Journal of Applied Polymer Science, Vol. 29, 3955–3964(1984)]. This device is prepared by casting and coating a solution of a polymer and a liquid crystal material in a solvent on a transparent electrode, evaporating the solvent to separate a polymer phase from a liquid crystal phase so as to form a composite film in which continuous pores in a polymer matrix having a three-dimensional network structure are filled with the liquid crystal material, then positioning another transparent electrode on the composite film.

In the above liquid crystal display device, when no voltage is applied, the incident light is scattered and the composite film is opaque since liquid crystal molecules in the pores are in random state. When a voltage is applied between a pair of transparent electrodes which sandwich the composite film, the liquid crystal molecules orient in the direction of electric field through the electro-optical effect, the incident light passes through the composite film without scattering and the composite film is converted to a transparent state in the case of $$\Delta\epsilon > 0$$

wherein $\Delta\epsilon$ is an anisotropy of a dielectric constant and defined by the equation:

$$\Delta\epsilon = \epsilon_\parallel - \epsilon_\perp$$

(wherein $\epsilon_\parallel$ is a dielectric constant in the direction of the molecular axis and $\epsilon_\perp$ is a dielectric constant in the direction perpendicular to the molecular axis).

The liquid crystal display device having the above structure can easily be made with a large area since the above composite film having the electro-optical effect can be prepared only by coating and drying a solution containing the polymer and the liquid crystal material. Since the composite film has flexibility by selecting the polymer and a flexible transparent film having electrical conductivity by the formation of a transparent electrically conductive layer on a surface can be used as the transparent electrode, the liquid crystal display device advantageously has flexibility.

The characteristic in the preparation of the above composite film is that the three-dimensional network structure is formed by the phase separation because of incompatibility of the polymer with the liquid crystal material when the solvent evaporates after casting the homogeneous solution containing the polymer and the liquid crystal material on the transparent electrode. Namely, the phase separation is induced by the solvent evaporation.

A method for preparing such composite film is known from the above literatures.

There are several known methods for preparing the composite film which contains the polymer and the liquid crystal and exhibits the electro-optical effect having the transformation between transparent and opaque states.

For example, H. G. Craighead et al., Appl. Phys. Lett., 40 (1), 22 (1982) and U.S. Pat. No. 4,411,495 disclose a method for filling the pores of an already formed porous polymer film with a liquid crystal material. According to this method, the polymer is separated from the liquid crystal material from the beginning and a step of the phase separation is not included.

Japanese Patent Kohyo Publication No. 501631/1983 (J. L. Fergason) discloses a method which comprises forming microcapsules from a liquid crystal material in an aqueous solution of polyvinyl alcohol to prepare a dispersion and then coating the dispersion.

In this method, when the liquid crystal material forms the microcapsules, the liquid crystal phase is separated from the polyvinyl alcohol phase. The solvent, namely water is a medium used for only the coating, and the evaporation of water does not participate in the phase separation. In the resultant film, the liquid crystal material is present in the form of a droplet covered with a capsule.

Japanese Patent Kohyo Publication No. 502128/1986 (J. W. Doane) discloses a method for thermosetting a mixture of an epoxy resin and a liquid crystal material with a curing agent. In this method, a solvent is absent and a phase separation is induced by the formation of a high molecular weight material through the curing of the epoxy resin. A liquid crystal material is present in the form of droplets in the resultant film.

Japanese Patent Kokai Publication No. 62615/1989 discloses a method for photosetting a mixture of a photosetting compound and a liquid material with the light exposure. Also in this method, a solvent is absent and the phase separation is induced by the formation of a high molecular weight material through the curing of the photosetting compound. Polymer Preprints, Japan, 38 (7), 2154 (1989) describes that the liquid crystal material is dispersed in the form of droplets in the film.

"The phase separation by the solvent evaporation" is an original method which is entirely different from the above other methods and was firstly published by the above literatures of Kajiyama et al. The liquid crystal material is present in the form of a continuous phase (not in the form of droplets) in the continuous pores of a polymer matrix having a three-dimensional network in the film. This is also distinct characteristics of the composite film of Kajiyama et al.

However, the liquid crystal display device having the composite film of Kajiyama et al has insufficient heat resistance. When the liquid crystal display device is used in a place continuously exposed to a high temperature, such as a display panel of automobiles, the contrast between the transparent and opaque states decreases, and the original contrast can not recovered even if the temperature of the device is returned to a room temperature.

It was found that since the conventional liquid crystal display device uses a thermoplastic resin such as an acrylic resin and a methacrylic resin as the polymer matrix, the three-dimensional network of the polymer matrix collapses and the contrast of the device accordingly decreases when the device is exposed to a high temperature.

To solve the above problem, it may be contemplated to form the polymer matrix from a hardening resin such as a thermosetting resin and a photosetting resin. The hardening resin has a three-dimensional network molecular structure which hardly thermally deforms. In addition, the hardening resin has a larger molecular weight than the thermoplastic resin and good heat resistance.

However, since the hardening resin which is cured to form the three-dimensional network molecular structure is hardly dissolved in a solvent, the phase separation method as stated above cannot be employed and the composite film cannot be prepared.

SUMMARY OF THE INVENTION

One object of the present invention is to solve the above problems.

Another object of the present invention is to provide a liquid crystal display device having good heat resistance and an effective method for preparing the same.

These and other objects of the present invention are achieved by a liquid crystal display device having a pair of transparent electrodes and a composite film in which continuous pores of a polymer matrix having a three-dimensional network structure are filled with a liquid crystal material, said polymer matrix being one selected from the group consisting of
(a) a cross-linked material prepared through an addition reaction of a carboxyl group-containing acrylonitrile/butadiene copolymer with an oxazoline compound, and
(b) a polyimide resin.

The liquid crystal display device having the three-dimensional network polymer matrix made of the cross-linked material (a) can be prepared by a method comprising coating, on a surface of one of a pair of transparent electrodes, a coating liquid which dissolves or disperses a liquid crystal material, a carboxyl group-containing acrylonitrile/butadiene copolymer and an oxazoline compound in a solvent, and evaporating the solvent to separate a carboxyl group-containing acrylonitrile/butadiene polymer phase from a liquid crystal material phase, whereby preparing the cross-linked material of the carboxyl group-containing acrylonitrile/butadiene copolymer and the oxazoline compound by an addition reaction and forming a composite film having continuous pores of the polymer matrix filled with the liquid crystal material.

The liquid crystal display device having the three-dimensional network polymer matrix made of the polyimide resin (b) can be prepared by a method comprising coating, on a surface of one of a pair of transparent electrodes, a coating liquid which dissolves or disperses a liquid crystal material and a polyamic acid in a solvent, and evaporating the solvent to separate a polyamic acid phase from a liquid crystal material phase, whereby preparing a polyimide resin by imidation through a dehydration ring formation reaction of the polyamic acid and forming a composite film having continuous pores of the polymer matrix filled with the liquid crystal material.

BRIEF DESCRIPTION OF THE DRAWING

FIGURE is a cross-sectional view of the liquid crystal display device of the present invention.

DETAILED DESCRIPTION OF THE INVENTION

In the liquid crystal display device of the present invention, the liquid crystal material can quickly respond as one phase to an applied voltage, since the polymer matrix has a three-dimensional network structure and the pores containing the liquid crystal material are continuous.

The contrast in the device is not decreased even if the device is used at a high temperature, since the polymer matrix has the three-dimensional network molecular structure having good heat resistance.

The liquid crystal display device can be prepared by almost the same steps as in the conventional methods.

The liquid crystal display device of the present invention has higher opaqueness at the opaque state than a device comprising a thermoplastic resin. Accordingly, the device of the present invention has increased contrast between the transparent and opaque states. The operation voltage in the device of the present invention is slightly low.

Since the cross-linking reaction proceeds during the phase separation so that the difference of the molecular weight between the polymer matrix and the liquid crystal material increases, the matrix phase is clearly separated from the liquid crystal phase and then the difference of refractive index between the polymer matrix and the liquid crystal material increases so that opaque degree of the composite film is high at the opaque state.

In addition, since the liquid crystal is clearly separated from the polymer matrix, the uniformity of the liquid crystal phase in the composite film is increased, and the liquid crystal phase can respond quickly to the applied voltage so that the operation voltage is decreased.

Figure shows a cross-sectional view of the liquid crystal display device of the present invention. The liquid crystal display device has a composite film 1 which is present between two transparent electrodes 2.

The transparent electrode 2 is, for example, an electrically conductive layer (for example, indium tin oxide (ITO) and $SnO_2$) formed on a transparent substrate such as a glass or a film of plastic (for example, polyethylene terephthalate (PET) or polyethersulfone (PES)) by a vapor deposition method, a sputtering method, a coating method and the like. An electrically conductive transparent glass or film which is used in a conventional liquid crystal panel may be used.

A thickness of the composite film is larger than a wavelength of visible light so as to make a liquid crystal display device of light scattering type. The thickness is preferably 5 to 100 $\mu$m, more preferably 10 to 30 $\mu$m since a driving voltage is too high when the thickness is larger.

The composite film may contain various conventionally known two-tone pigments so as to use the display device as a color display device.

The liquid crystal material may be a nematic liquid crystal, a smectic liquid crystal and a cholesteric liquid crystal. The nematic liquid crystal is not limited, but is preferably one which has a large anisotropy of the dielectric constant $\Delta\epsilon$, since excellent properties can be obtained. The liquid crystal material may contain a chiral component.

The polymer matrix is made of
(a) a cross-linked material prepared through an addition reaction of a carboxyl group-containing acrylonitrile/butadiene copolymer with an oxazoline compound, or
(b) a polyimide resin.

The polymer matrix may be (a) the cross-linked material of the carboxyl group-containing acrylonitrile/butadiene copolymer with the oxazoline compound by the addition reaction or (b) the polyimide resin prepared by the dehydration ring formation reaction of the polyamic acid.

The cross-linked material (a) and the polyimide resin (b) are transparent and have almost the same refractive index (refractive index n=1.46–1.52) as those of the transparent electrodes and the liquid crystal material. Therefore they can display the image uniformly and clearly. Since the cross-linked material (a) and the polyimide resin (b) have a high dielectric constant and easily disperse an applied voltage, the localization of the applied voltage is prevented and the device can uniformly display the image over all the surface of the device.

The cross-linked material (a) has higher flexibility than a cross-linked material of the conventional resin, since the carboxyl group-containing acrylonitrile/butadiene copolymer has a flexible butadiene unit.

The carboxyl group-containing acrylonitrile/butadiene copolymer can be prepared by using (meth)acrylic acid as a third monomer when acrylonitrile and butadiene are copolymerized.

A molar ratio of acrylonitrile, butadiene and (meth)acrylic acid can be suitably selected. An amount of acrylonitrile is preferably from 1 to 40% by mole, more preferably from 5 to 35% by mole, most preferably about 28% by mole based on the polymer. An amount of butadiene is preferably from 98 to 50% by mole, more preferably from 83 to 57% by mole, most preferably about 68% by mole based on the polymer. An amount of (meth)acrylic acid is preferably from 1 to 10% by mole, more preferably from 2 to 8% by mole, most preferably about 4% by mole based on the polymer. A molecular weight of the acrylonitrile/butadiene copolymer is preferably from 100,000 to 5,000,000.

The oxazoline compound preferably has at least one, more preferably at least two oxazoline groups in one molecule. Specific examples of the oxazoline compound are 2,2'-(1,3-phenylene)-bis(2-oxazoline), 2-phenyl-2-oxazoline, 2-methyl-2-oxazoline and 2-ethyl-2-oxazoline.

Since the carboxyl group-containing acrylonitrile/butadiene copolymer as such is one of the conventional thermoplastic resins having the linear or branched molecular structure, it is soluble in the solvent. The liquid crystal display device having the composite film containing the polymer matrix made of the cross-linked material of the carboxyl group-containing acrylonitrile/butadiene copolymer according to the present invention can be prepared in substantially the same manner as in a conventional liquid crystal display device having a composite film containing a polymer matrix made of a thermoplastic resin.

According to the present invention, the composite film having the continuous pores of the three-dimensional network polymer matrix filled with the liquid crystal material is prepared by coating the coating liquid on the surface of one of transparent electrodes, which coating liquid comprises the liquid crystal material, the carboxyl group-containing acrylonitrile/butadiene copolymer and the oxazoline compound dissolved or dispersed in the solvent, and evaporating the solvent to separate the polymer phase from the liquid crystal material phase. The carboxyl group-containing acrylonitrile/butadiene copolymer carries out an addition reaction with the oxazoline compound simultaneously with the formation of the composite film by the phase separation. Therefore, the polymer matrix having the continuous pores finally consists of the cross-linked material which is an addition reaction product.

The addition reaction is initiated by mixing the oxazoline compound with the copolymer in the coating liquid. The both components are mixed preferably immediately before coating the coating liquid on the surface of the transparent electrode so as to prevent the unhomogenous coating due to the premature addition reaction. It is recommendable to separately prepare the oxazoline compound and the coating liquid containing the liquid crystal material and the carboxyl group-containing acrylonitrile/butadiene copolymer dissolved or dispersed in the solvent and to mix the oxazoline compound with the coating liquid immediately before the coating.

Since the oxazoline compound remained in the liquid crystal material after the phase separation has an adverse effect on the properties of the device, the temperature and time in steps of from the coating liquid preparation to the composite film formation are preferably controlled so that residual amount of the oxazoline compound is small.

In order to prevent the residual of the oxazoline compound, an amount of the functional COOH group is preferably larger than that of the functional oxazoline group. A molar ratio of the functional COOH group to the oxazoline group is preferably from 0.2:1 to 5:1.

The solvent can be selected from various solvents depending on the kinds of the acrylonitrile/butadiene copolymer, the oxazoline compound and the liquid crystal material.

Preferably, the solvent has a low boiling point (a high vapor pressure) so as to easily vaporize. When the solvent hardly vaporizes, the phase separation is not good and the composite film may not be formed since the drying and solidification need long time after the coating of the coating liquid on the transparent electrode.

Specific examples of the solvent are acetone, dichloromethane, dichloroethane, chloroform, N,N-dimethylformamide, N-methylpyrrolidone, tetrahydrofuran, hexane, methyl acetate and ethyl acetate.

The composition ratio of components is not critical, and it can be selected from various ratios according to the method for coating the coating liquid on the transparent electrode, a thickness of composite film and the like. A weight ratio of the acrylonitrile/butadiene copolymer to the liquid crystal in the coating liquid is preferably from 3:97 to 80:20, more preferably from 5:95 to 50:50.

An amount of the solvent is from 50 to 98 parts by weight, preferably 60 to 95 parts by weight per 100 parts by weight of the coating liquid.

The polymer matrix may be made of the polyimide resin (b). The polyimide resin can be usually prepared by the imidation of the polyamic acid through the dehydration ring formation reaction. Since the polyimide resin has high heat resistance together with mechanical, electrical and chemical stability, it can be advantageously used in a liquid crystal display device which is used under a severely high temperature conditions. A fluorinated polyimide resin having high transparency is particularly preferable.

The polyamic acid which is a raw material for the polyimide resin can be prepared by a polycondensation of an aromatic diacid anhydride with an aromatic diamine. The polyamic acid may be provided in the form of a varnish, a film, powder or the like, and can be dissolved in a solvent or processed in the same manner as in a thermoplastic resin. Specific examples of the polyamic acid are as follows:

crystal display device containing the composite film having the three-dimensional network polymer matrix made of the polyimide resin can be prepared by substantially the same manner as in the preparation of the conventional liquid crystal display device having the polymer matrix made of the thermoplastic resin.

According to the present invention, the composite film having the three-dimensional network pores of the polymer matrix filled with the liquid crystal material can be prepared by coating the liquid on the surface of one of transparent electrodes, which liquid comprises the liquid crystal material and the polyamic acid dissolved or dispersed in the solvent, and evaporating the solvent to separate the polyamic acid phase from the liquid crystal material phase. Then, the composite film

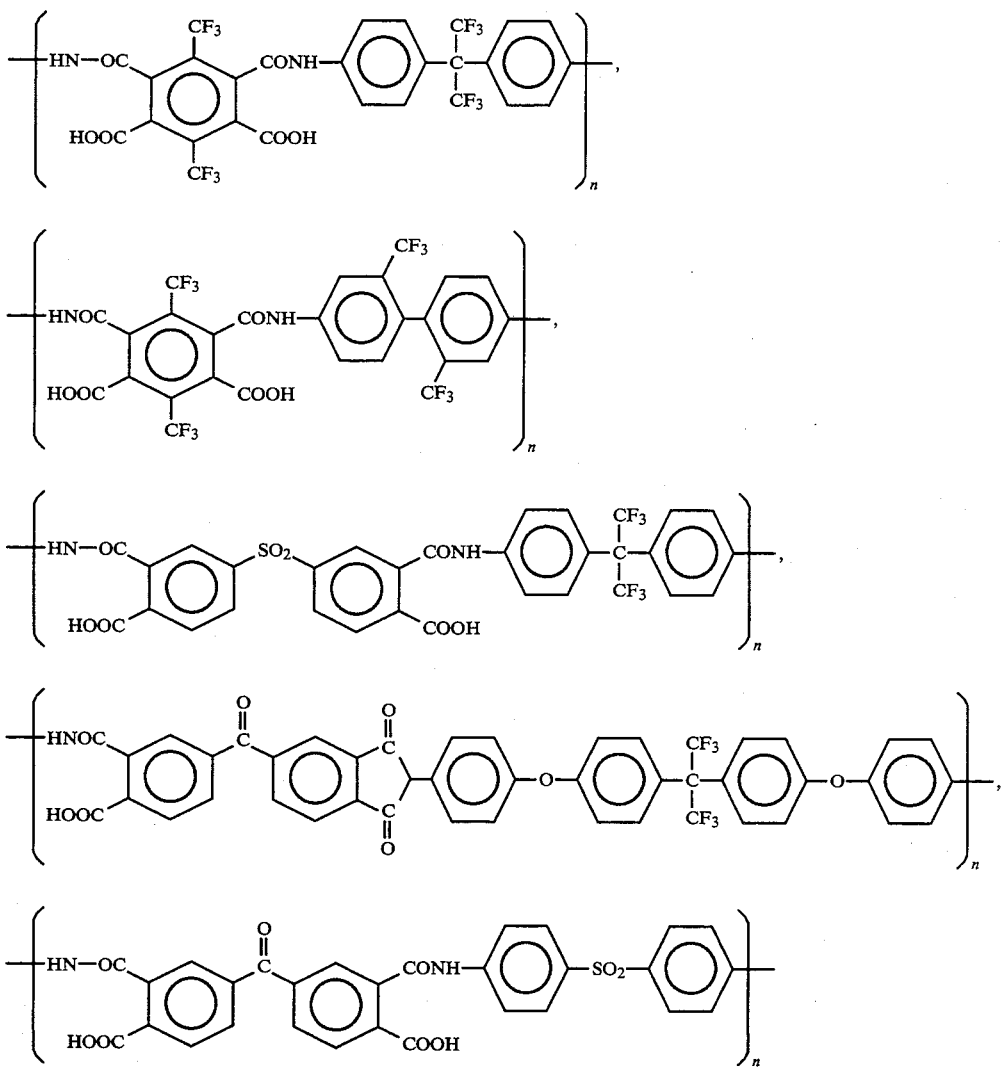

(n is from 1 to 2000, preferably from 1 to 100).

The imidation of the polyamic acid can be chemically conducted by a dehydration ring formation reaction using a dehydrating agent and a catalyst. But, the polyamic acid as such may only be heated to a certain temperature to conduct the dehydration ring formation reaction so that an imidation is proceeded to prepare the polyimide resin.

In the method for preparing the liquid crystal display device according to the present invention, the liquid is heated to a suitable temperature so that the imidation of polyamic acid is conducted to prepare the composite film having the polymer matrix made of the polyimide resin.

When the polyimide resin is produced by the imidation of polyamic acid, the imidation of polyamic acid is not completely conducted but is partially conducted so that at least parts of amic acid group remain. The partial imidation gives improved adherence of the composite film to the transparent electrodes, prevents the displacement and the delamination of the composite film, makes the liquid crystal display device flexible, and make a large area of the device easy. The amic acid group remains in an amount of preferably from 3 to 60% mole, more preferably from 5 to 50% by mole based on the total moles of amic acid and imide acid groups.

The solvent can be selected from various solvents depending on the kinds of the polyamic acid and the liquid crystal material.

Specific examples of the solvent are acetone, dichloromethane, dichloroethane, chloroform, N,N-dimethylformamide, N-methylpyrrolidone, tetrahydrofuran, hexane, methyl acetate and ethyl acetate.

A weight ratio of the component is not limited, and it can be selected depending on the method for coating the coating liquid on the transparent electrode, the thickness of the formed composite film and the like.

A weight ratio of polyamic acid to the liquid crystal in the coating liquid is preferably from 2:98 to 80:20, more preferably from 5:95 to 50:50.

An amount of the solvent is from 50 to 98 parts by weight, preferably 60 to 95 parts by weight per 100 parts by weight of the coating liquid.

The method for coating the coating liquid on the transparent electrode may be a conventional method such as a bar coating method, a spin coating method, a spray coating method, a roller coating method, and a curtain coating method.

Another transparent electrode is laminated on the composite film prepared as state above to prepare the liquid crystal display device of the present invention shown in FIGURE.

A thickness of the liquid crystal display device is usually from 5 to 1000 μm, preferably from 10 to 800 μm.

PREFERRED EMBODIMENT OF THE INVENTION

The present invention will be illustrated by the following Examples and Comparative Examples.

EXAMPLE 1

A carboxyl group-containing acrylonitrile/butadiene copolymer (PNR-1H manufactured by Nippon Synthetic Rubber) (30 parts by weight) was mixed with 2,2'-(1,3-phenylene)-bis(2-oxazoline) [2.27 parts by weight (the same equivalent as carboxyl group of the carboxyl group-containing acrylonitrile/butadiene copolymer)] to prepare a mixture.

The mixture and a liquid crystal material (E63 manufactured by Merck, Japan) in the weight ratio of 4:6 were dissolved in tetrahydrofuran as a solvent to prepare a coating liquid (dissolved substance concentration as whole: 15% by weight).

Then, the coating liquid was coated on an electrically conductive transparent film (ITO/polyethersulfone film, thickness: 100 μm) by a bar coating method and dried at a room temperature for 30 minutes and then at 130° C. for 30 minutes to prepare a composite film having a thickness of 30 μm.

The same electrically conductive transparent film as the above transparent film was positioned on the composite film to prepare a liquid crystal display device.

EXAMPLE 2

A liquid crystal display device was prepared in the same manner as in Example 1 except that 2,2'-(1,3-phenylene)-bis(2-oxazoline) was used in an amount of 4.54 parts by weight which was twice the equivalent of the carboxyl group of the carboxyl group-containing acrylonitrile/butadiene copolymer.

EXAMPLE 3

A liquid crystal display device was prepared in the same manner as in Example 1 except that the composite film was dried at a room temperature for 30 minutes and then at 150° C. for 10 minutes.

COMPARATIVE EXAMPLE 1

Polybutadiene (E-1000 manufactured by Nippon Oil) and a liquid crystal material (E63 manufactured by Merck, Japan) in a weight ratio of 4:6 was dissolved in tetrahydrofuran as a solvent so that the dissolved substance concentration was 15% by weight to prepare a coating liquid.

Then, the coating liquid was coated on an electrically conductive transparent film (ITO/polyethersulfone film, thickness: 100 μm) by a bar coating method and dried at a room temperature for 30 minutes and then at 70° C. for 30 minutes to prepare a composite film having a thickness of 30 μm.

The same electrically conductive transparent film as the above transparent film was positioned on the composite film to prepare a liquid crystal display device.

COMPARATIVE EXAMPLE 2

A liquid crystal display device was prepared in the same manner as in Comparative Example 1 except that the same carboxyl group-containing acrylonitrile/butadiene copolymer as in Example 1 was used instead of polybutadiene.

COMPARATIVE EXAMPLE 3

A liquid crystal display device was prepared in the same manner as in Comparative Example 1 except that polyvinyl acetal (KS-5 manufactured by Sekisui Kagaku) was used instead of polybutadiene.

With respect to the liquid crystal display devices prepared in Examples 1 to 3 and Comparative Examples 1 to 3, the following tests were conducted.

ELECTRO-OPTICAL RESPONSE TEST

The liquid crystal display device was positioned in a spectrophotometer (UV-160 manufactured by Shimadzu). An AC sinusoidal voltage of 60 Hz was applied between the transparent electrodes to measure relationship between an applied voltage and a transmittance of light having a 600 nm wave length.

A transmittance $T_0$ (%) at an applied voltage of 0 V, a saturated transmittance $T_S$ (%), a contrast ($T_S/T_0$) and a applied voltage $V_S$ (V) which gives the saturated transmittance were determined.

HEAT RESISTANCE TEST

After the liquid crystal display devices were positioned in an electrical oven and stood at 80° C. for 2000 hours, relationship between an applied voltage and a transmittance of light having a 600 nm wave length was measured in the same manner as stated above.

Then, a $t_S/t_0$ [$t_S$ (%): saturated transmittance, $t_0$ (%): transmittance at 0 V applied voltage] was measured as a contrast after the heat treatment.

Results are shown in Table 1.

TABLE 1

| Example No. | $T_0$ | $T_s$ | $V_s$ | $T_s/T_0$ | $t_s/t_0$ |
| --- | --- | --- | --- | --- | --- |
| 1 | 25 | 85 | 10 | 3.4 | 3.6 |
| 2 | 28 | 84 | 15 | 3.0 | 3.2 |
| 3 | 20 | 86 | 10 | 4.3 | 4.3 |
| Com. 1 | 20 | 84 | 35 | 4.2 | 2.8 |
| Com. 2 | 35 | 83 | 40 | 2.37 | 1.8 |
| Com. 3 | 25 | 85 | 45 | 3.4 | 2.8 |

As clear from results of Table 1, the conventional liquid crystal display devices having a polymer matrix made of a thermoplastic resin in Comparative Examples 1 to 3 have a high applied voltage giving a saturated transmittance and poor response to an applied voltage. In addition, they have poor heat resistance since a contrast after the heat treatment is significantly decreased.

The liquid crystal display devices of Examples 1 to 3 have so low applied voltage giving a saturated transmittance that they have good response to an applied voltage, and they have no low contrast after the heat treatment such that they have excellent heat resistance.

EXAMPLE 4

A fluorinated polyamic acid (refractive index n: 1.499) and a liquid crystal material (E63 manufactured by Merck, Japan) in a weight ratio of 4:6 were dissolved in acetone as a solvent to prepare a coating liquid (dissolved substance concentration as whole: 15% by weight).

Then, the coating liquid was coated on an electrically conductive transparent film (ITO/polyethersulfone film, thickness: 100 μm) by a bar coating method and dried at a room temperature for 30 minutes and then at 80° C. for 30 minutes to prepare a composite film having a thickness of 30 μm.

The same electrically conductive transparent film as the above transparent film was positioned on the composite film to prepare a liquid crystal display device.

EXAMPLE 5

A liquid crystal display device was prepared in the same as in Example 4 except that an amic acid (refractive index: 1.490) was used instead of the fluorinated polyamic acid, methyl acetate was used as the solvent, and the composite film was dried at 180° C. for 10 minutes to conduct the 70% imidation of the amic acid.

EXAMPLE 6

A liquid crystal display device was prepared in the same as in Example 4 except that an amic acid (refractive index: 1.485) was used instead of the fluorinated polyamic acid, chloroform was used as the solvent, and the composite film was dried at 200° C. for 5 minutes to conduct the 70% imidation of the amic acid.

COMPARATIVE EXAMPLE 4

Polymethyl methacrylate (Delpet manufactured by Asahi Kasei Kogyo) and a liquid crystal material (E63 manufactured by Merck, Japan) in a weight ratio of 4:6 were dissolved in acetone as a solvent to prepare a coating liquid (dissolved substance concentration as whole: 15% by weight).

Then, the coating liquid was coated on an electrically conductive transparent film (ITO/polyethersulfone film, thickness: 100 μm) by a bar coating method and dried at a room temperature for 30 minutes and then at 80° C. for 30 minutes to obtain a composite film having a thickness of 30 μm.

The same electrically conductive transparent film as the above transparent film was positioned on the composite film to obtain a liquid crystal display device.

COMPARATIVE EXAMPLE 5

A liquid crystal display device was prepared in the same manner as in Comparative Example 4 except that polystyrene (Dic styrene manufactured by Dainippon Ink) was used instead of polymethyl methacrylate.

COMPARATIVE EXAMPLE 6

A liquid crystal display device was prepared in the same manner as in Comparative Example 4 except that polycarbonate (Iupilon manufactured by Mitsubishi Gas Chemical) was used instead of polymethyl methacrylate.

With respect to the liquid crystal display devices prepared in Examples 4 to 6 and Comparative Examples 4 to 6, the following tests were conducted.

ELECTRO-OPTICAL RESPONSE TEST

The liquid crystal display device was positioned in a spectrophotometer (UV-160 manufactured by Shimadzu). An AC sinusoidal voltage of 60 Hz was applied between the transparent electrodes to measure relationship between an applied voltage and a transmittance of light having a 600 nm wave length.

Then, a transmittance $T_0$ (%) at an applied voltage of 0 V, a transmittance $T_{80}$ (%) at an applied voltage of 80 V, a saturated transmittance $T_S$ (%), a contrast $T_{80}/T_0$ and an applied voltage $V_S$ (V) which gives the saturated transmittance were determined.

HEAT RESISTANCE TEST

After the liquid crystal display devices were positioned in an electrical oven and stood at 80° C. for 2000 hours, relationship between an applied voltage and a transmittance of light having a 600 nm wave length was measured in the same manner as stated above.

Ratio $t_{80}/t_0$ [$t_{80}$: a transmittance at an applied voltage of 80 V, $t_0$: a transmittance at an applied voltage of 0 V] was determined as a contrast after the heat treatment.

Results are shown in Table 2.

TABLE 2

| Example No. | $T_0$ | $T_{80}$ | $T_s$ | $V_s$ | $T_{80}/T_0$ | $t_{80}/t_0$ |
| --- | --- | --- | --- | --- | --- | --- |
| 4 | 16.9 | 88 | 88 | 20 | 5.2 | 5.0 |
| 5 | 15.9 | 86 | 86 | 15 | 5.4 | 5.2 |
| 6 | 15.2 | 85 | 85 | 15 | 5.6 | 5.5 |
| Com. 4 | 19.5 | 78 | 88 | 40 | 4.0 | 1.6 |
| Com. 5 | 21.0 | 80 | 90 | 35 | 3.8 | 1.53 |
| Com. 6 | 19.0 | 80 | 89 | 45 | 4.2 | 1.61 |

As clear from results of Table 2, the conventional liquid crystal display devices having a polymer matrix made of a thermoplastic resin in Comparative Examples 4 to 6 have a high applied voltage giving a saturated transmittance and poor response to an applied voltage. In addition, they have poor heat resistance since a contrast after the heat treatment is significantly decreased.

The liquid crystal display devices of Examples 4 to 6 have so low applied voltage giving a saturated transmittance that they have good response to an applied voltage, and they have no low contrast after the heat treatment such that they have excellent heat resistance.

What is claimed is:

1. A liquid crystal display device having a pair of transparent electrodes and a composite film in which continuous pores of a polymer matrix having a three-dimensional network structure is filled with a liquid crystal material, said matrix being one selected from the group consisting of
   (a) a cross-linked material prepared through an addition reaction of a carboxyl group-containing acrylonitrile/butadiene copolymer with an oxazoline compound, wherein the carboxyl group containing acrylonitrile/butadiene copolymer consists of from 1 to 40% by mole of acrylonitrile, from 50 to 98% by mole of butadiene, and from 1 to 10% by mole of (meth)acrylic acid, and
   (b) a fluorinated polyimide resin.

2. A liquid crystal display device as recited in claim 1, wherein the oxazoline compound in the component (a) has at least one oxazoline group in one molecule.

3. A liquid crystal display device as recited in claim 1, wherein the oxazoline compound is one selected from the group consisting of 2,2'-(1,3-phenylene)-bis(2-oxazoline), 2-phenyl-2-oxazoline, 2-methyl-2-oxazoline and 2-ethyl-2-oxazoline.

4. A liquid crystal display device as recited in claim 1, wherein the fluorinated polyimide resin (b) is prepared by the imidation of a polyamic acid through the dehydration ring formation reaction.

5. A liquid crystal display device as recited in claim 1, wherein the polyimide resin (b) has an amic acid group and an imide group.

6. A method for preparing a liquid crystal display device having a three-dimensional network polymer matrix made of a cross-linked material, comprising coating, on a surface of one of a pair of transparent electrodes, a coating liquid which dissolves or disperses a liquid crystal material, a carboxyl group-containing acrylonitrile/butadiene copolymer and an oxazoline compound in a solvent, and evaporating the solvent to separate a carboxyl group-containing acrylonitrile/butadiene polymer phase from a liquid crystal material phase, whereby preparing the cross-linked material of the carboxyl group-containing acrylonitrile/butadiene copolymer and the oxazoline compound by an addition reaction and forming a composite film having continuous pores of the polymer matrix filled with the liquid crystal material, wherein the carboxyl group-containing acrylonitrile/butadiene copolymer consists of from 1 to 40% by mole of acrylonitrile, from 98 to 50% by mole of butadiene and from 1 to 10% by mole of (meth)acrylic acid.

7. A method for preparing a liquid crystal display device having a three-dimensional network polymer matrix made of a fluorinated polyimide resin, comprising coating, on a surface of one of a pair of transparent electrodes, a coating liquid which dissolves or disperses a liquid crystal material and a polyamic acid in a solvent, and evaporating the solvent to separate a polyamic acid phase from a liquid crystal material phase, whereby preparing a fluorinated polyimide resin by imidation through a dehydration ring formation reaction of the polyamic acid and forming a composite film having continuous pores of the polymer matrix filled with the liquid crystal material.

8. A liquid crystal display device as recited in claim 1, wherein the carboxyl group-containing acrylonitrile/butadiene copolymer in the component (a) consists of 28% by mole of acrylonitrile, 68% by mole of butadiene and 4% by mole of (meth)acrylic acid.

9. A liquid crystal display device as recited in claim 1, wherein the polyimide resin (b) is prepared so that some of an amic acid group remains in the fluorinated polyimide resin (b).

10. A liquid crystal display device as recited in claim 9, wherein an imidation ratio of an amic acid group in the fluorinated polyimide resin (b) is 70%.

11. A method for preparing a liquid crystal display device as recited in claim 6, wherein the coating liquid containing the liquid crystal material and the carboxyl group-containing acrylonitrile/butadiene copolymer dissolved or dispersed in the solvent is prepared and then the oxazoline compound is mixed with the coating liquid before the coating.

12. A method for preparing a liquid crystal display device as recited in claim 7, wherein the fluorinated polyimide resin (b) is 70%.

* * * * *